(No Model.) 2 Sheets—Sheet 1.

T. CURLEY.
CAR FENDER.

No. 583,170. Patented May 25, 1897.

Witnesses:
J. W. Fisher
Walter Nelius

Inventor,
Thomas Curley
by Robert W. Hardie
Attorney.

(No Model.) 2 Sheets—Sheet 2.

T. CURLEY.
CAR FENDER.

No. 583,170. Patented May 25, 1897.

Witnesses:
J. W. Fisher
Walter Melvin

Inventor,
Thomas Curley
by
Robert W. Kendrie
Attorney.

UNITED STATES PATENT OFFICE.

THOMAS CURLEY, OF TROY, NEW YORK.

CAR-FENDER.

SPECIFICATION forming part of Letters Patent No. 583,170, dated May 25, 1897.

Application filed July 23, 1896. Serial No. 600,198. (No model.)

*To all whom it may concern:*

Be it known that I, THOMAS CURLEY, a citizen of the United States, residing at Troy, in the county of Rensselaer and State of New York, have invented certain new and useful Improvements in Car-Fenders; and I do hereby declare the following to be a full, clear, and exact description of the invention, such as will enable others skilled in the art to which it appertains to make and use the same.

My invention has for its object to provide a car-fender which shall be simple and strong in construction and effective in operation. This I accomplish by the means illustrated in the accompanying drawings, in which—

Figure 1:
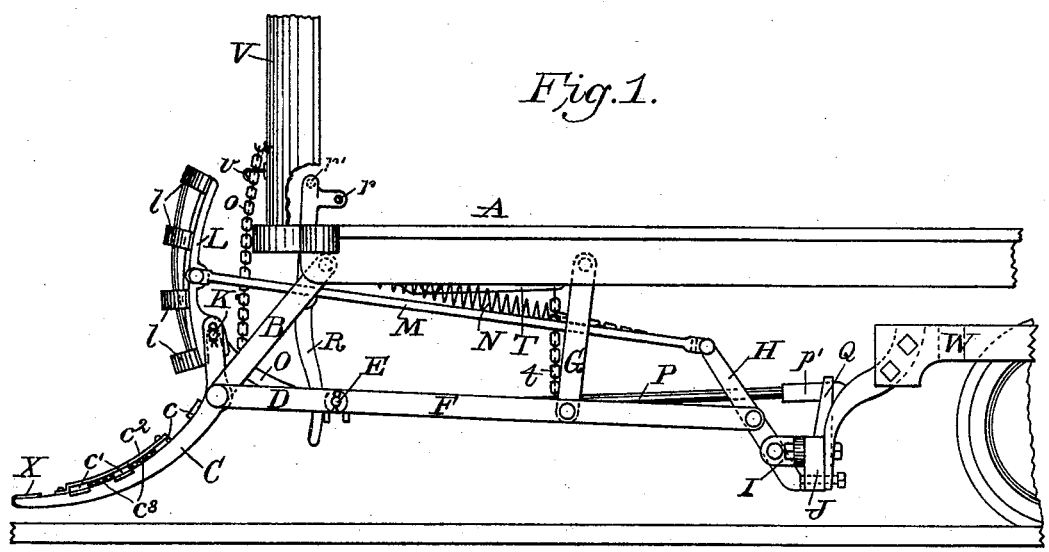
Figure 2:
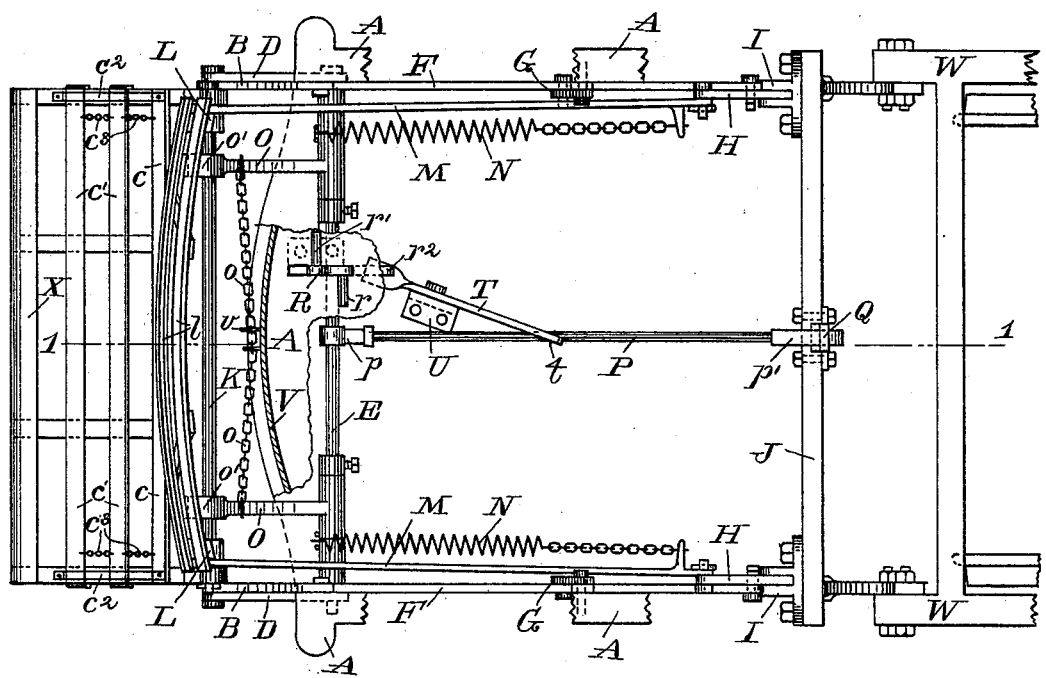
Figure 3:
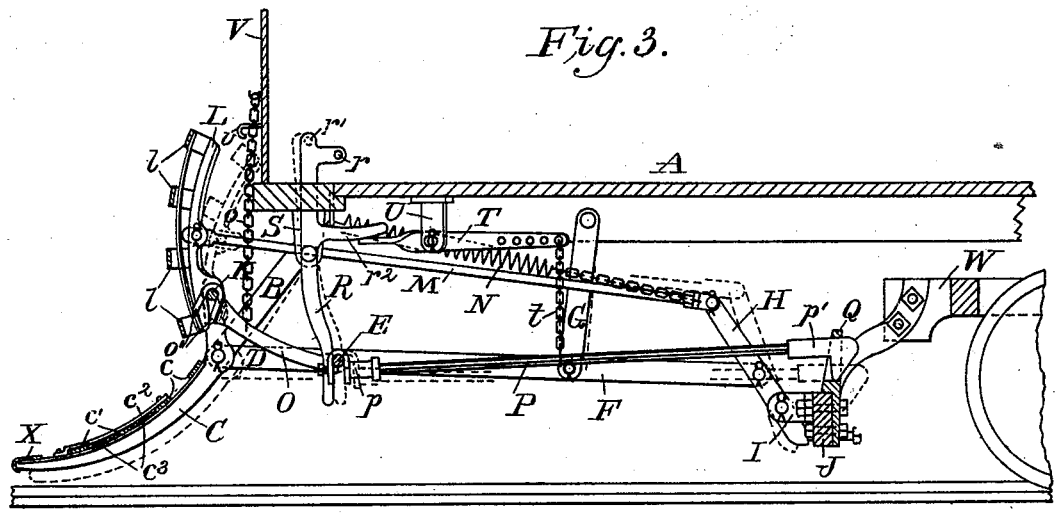
Figure 4:
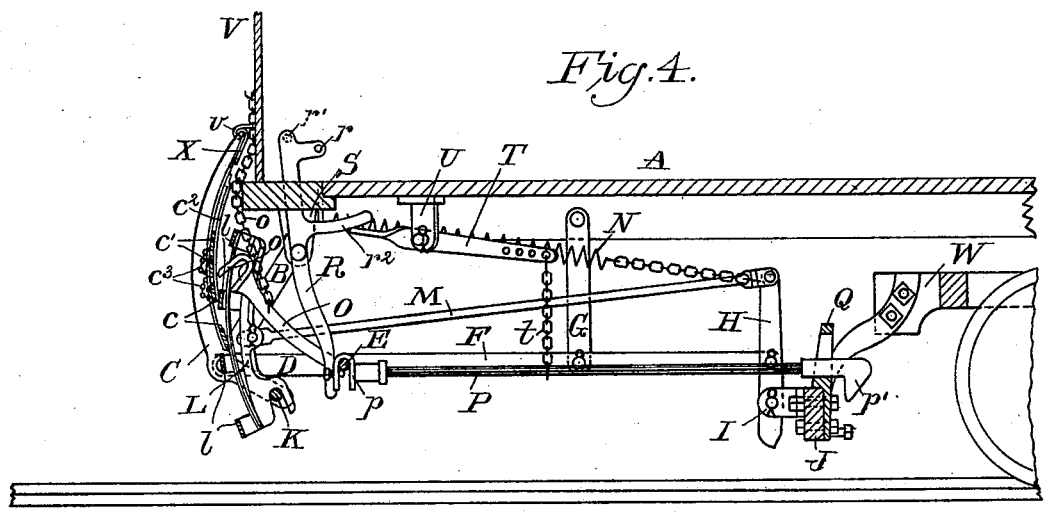

Figure 1 is a side view of a car provided with a fender embodying my invention. Fig. 2 is a plan of the same with the platform partly broken away. Fig. 3 is a vertical longitudinal section taken on line 1 1 of Fig. 2. Fig. 4 is a vertical longitudinal section of the parts shown in Fig. 3, showing the fender folded as when not in use.

The fender consists of three sets of elements—a longitudinally-movable carrying-frame, a main guard-frame, and an auxiliary guard-frame.

As illustrated in the drawings, A represents the platform of a car, and W a portion of the truck-frame upon which the platform is supported. The horizontally-movable frame consists of similar hangers B and G, pivoted to the sides of the car-platform, the hangers B inclining considerably forward. Horizontal bars in two sections D and F are pivoted to a cross-bar E at their meeting ends and also pivoted to the lower ends of the hangers B and G. The rear end of the horizontal bars F are pivoted to levers or arms H, which arms are fulcrumed to some suitable portion of the truck, as the bracket I, secured to a cross-bar J. A foot-lever R is pivoted to the platform of the car and extends downward, so as to press at its lower end against the cross-bar E.

A locking-bar P is secured at its forward end to the cross-bar E, and is provided on its rear end with a latch $p'$, which is adapted to engage a keeper Q, attached to the cross-bar J.

A lever T is fulcrumed to the platform of the car by means of a bracket U, and one end of the lever is adapted to bear against an arm $r^2$ of the lever R. The other end of the lever is connected by any suitable means, as the chain $t$, with the locking-bar P, so that when the arm $r^2$ of the lever R is pressed downward the forward end of the lever T is depressed, thereby raising the rear end of the lever and the rear portion of the bar P until the latch $p'$ is released from the keeper Q. When the parts are in such position, the upper end of the arm H is drawn forward by means of the spring N, thereby moving the frame forward into the position indicated by full lines in Fig. 3.

The horizontal or longitudinally-movable frame supports a main guard-frame which is provided with side bars C, curved downward, but preferably somewhat in line with the forward hangers B, so as to brace said side bars. The upper ends of the side bars C extend vertically and are connected together by means of a cross-bar K.

Cross-bars $c$ and $c'$ extend transversely of the main guard-frame, the bars $c'$ being free to move in ways formed by the strap $c^2$ and the side bars C. The ends of the cross-bars $c'$ are preferably turned down, so as to prevent any movement in the direction of their length. The bars $c'$ are connected together by means of chains $c^3$ or other suitable means, and they are also connected to one of the stationary cross-bars $c$ or other portion of the guard-frame. By this means when the main guard-frame is not in use and is folded up, as shown in Fig. 4, the transverse bars $c'$ drop downward, leaving the bumper of the car exposed, so that two cars may be readily connected together, when desired.

The main guard-frame is held firmly in place when in use by means of braces O, pivoted to the transverse bar E, and provided on their forward ends with hooks $o'$, adapted to engage the transverse bar K and brace the main guard-frame in position. Connected with the braces O is a chain $o$ or other suitable device, by means of which the forked or hooked ends of the braces O may be released from the bar K.

The main guard-frame supports a supplemental guard-frame having side bars L, which are pivotally supported at their lower ends on the transverse bar K. The side bars of the supplemental guard-frame are connected with the upper ends of the levers H by means of connecting-rods M, so that when pressure is applied against the front of the auxiliary frame, forcing it backward, the connecting-rods M press backward the upper end of the lever H and stretch the spring N, thereby forming a kind of spring-cushion for the auxiliary frame.

The several parts when in ordinary use are arranged in the position indicated in Fig. 1 and by the full lines of Fig. 3 of the drawings. When it is desired to remove an obstacle from the track or path of the car, the upper end of the lever R is pressed forward, which forces the lower end of the lever R and the horizontal frame backward, as indicated by dotted lines in Fig. 3, bringing the front bar of the main guard-frame very close to the ground and causing the latch $p'$ to drop into the keeper Q and hold the several parts securely in position. When, moreover, the car is in motion and the front of the main guard-frame strikes an object, the same movement of the parts constituting the carrying-frame and locking-bar P takes place automatically, bringing such parts into the position indicated by dotted lines in Fig. 3.

The construction and arrangement of the several parts of this device are such that the lower portion of the main guard-frame remains at the same uniform distance from the ground, although the ends of the car may rock considerably. This feature of my device is due to the peculiar construction and arrangement of the parts and to the manner in which the horizontal frame is connected with both the platform and the truck of the car.

The main guard-frame may be folded up out of the way when desired by releasing the front end of the braces O from the bar K by means of the chain $o$ or other suitable device and then lifting up the front portion of the main guard-frame until the main guard-frame assumes a nearly vertical position. The side bars C then move on their pivotal connections with the forward ends of the bars D and hangers B in such a manner as to force backward and downward the upper portions of said arms C and the cross-bar K, which in turn depress the supplemental guard-frame and the several parts connected with it until such parts are in the position indicated in Fig. 4. The forward end of the main guard-frame may be held in such position when in use by means of the hook $u$.

What I claim is—

1. In a car-fender the combination with the platform and truck of a car, of a longitudinally-movable frame connected with both the platform and truck, a main guard-frame provided with side bars pivoted to said longitudinally-movable frame, and extending upward from such pivotal connection, a cross-bar connecting such upturned portions of said side bars, and an auxiliary frame pivoted on said cross-bar substantially as shown and described.

2. In a car-fender, the combination with the platform and truck of a car, of a longitudinally-movable frame connected with both the platform and truck, a locking-lever adapted to secure said frame in retracted position, a main guard-frame mounted on said longitudinally-movable frame, and an auxiliary guard-frame mounted on said main guard-frame, substantially as shown and described.

3. In a car-fender the combination with a longitudinally-movable frame attached to both the platform and truck of a car, of a main guard-frame mounted on said longitudinally-movable frame, an auxiliary guard-frame mounted on said main guard-frame, and connecting-rods extending between said auxiliary frame and a lever fulcrumed on the truck of car, substantially as shown and described.

4. In a car-fender the combination with a longitudinally-movable frame attached to both the platform and truck of a car, of a main guard-frame supported on said longitudinally-movable frame, an auxiliary guard-frame mounted on said main guard-frame, connecting-rods extending between said auxiliary guard-frame and a lever fulcrumed to the truck of a car, and spring connections between the platform of the car and said connecting-rods and lever adapted to produce a spring resistance to a backward movement of said auxiliary frame, substantially as shown and described.

5. In a car-fender the combination with a longitudinally-movable frame attached to both the platform and truck of a car, of a main guard-frame mounted on said longitudinally-movable frame, braces secured at one end to one of said frames, and detachably secured at their other ends to the other of said frames, and an auxiliary guard-frame mounted on said main guard-frame, substantially as shown and described.

6. In a car-fender a hinged or pivoted guard-frame provided with transverse bars or slats connected together and having a free sliding movement, whereby said slats may come together when the frame is upturned and drop downward to the desired places when the frame is lowered, substantially as shown and described.

In testimony whereof I affix my signature in presence of two witnesses.

THOMAS CURLEY.

Witnesses:
MAUDE PRIOR,
ROBERT W. HARDIE.